(12) United States Patent
Eller

(10) Patent No.: US 11,874,061 B2
(45) Date of Patent: Jan. 16, 2024

(54) SYSTEM AND METHOD FOR MANUFACTURING A SPACE-BASED COMPONENT

(71) Applicant: NORTHROP GRUMMAN SYSTEMS CORPORATION, Falls Church, VA (US)

(72) Inventor: Howard S. Eller, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/936,199

(22) Filed: Sep. 28, 2022

(65) Prior Publication Data

US 2023/0028055 A1 Jan. 26, 2023

Related U.S. Application Data

(60) Continuation of application No. 16/718,938, filed on Dec. 18, 2019, now Pat. No. 11,492,150, which is a
(Continued)

(51) Int. Cl.
| | |
|---|---|
| *B64G 1/22* | (2006.01) |
| *B64G 4/00* | (2006.01) |
| *F27B 14/10* | (2006.01) |
| *F27B 14/06* | (2006.01) |
| *F27B 14/14* | (2006.01) |
| *B33Y 30/00* | (2015.01) |

(Continued)

(52) U.S. Cl.
CPC .............. *F27B 14/10* (2013.01); *B22F 3/003* (2013.01); *B22F 5/00* (2013.01); *B22F 12/226* (2021.01); *B22F 12/44* (2021.01); *B64G 1/22* (2013.01); *B64G 4/00* (2013.01); *F27B 14/06* (2013.01); *F27B 14/14* (2013.01); *B22F 2202/09* (2013.01); *B29L 2031/3097* (2013.01); *B33Y 30/00* (2014.12)

(58) Field of Classification Search
CPC ......... B33Y 10/00; B33Y 30/00; B33Y 80/00; B22F 3/003; B22F 5/00; B22F 2202/09; B64G 1/22; B64G 4/00; B64G 2004/005; F27B 14/10; F27B 14/06; F27B 14/14; B29L 2031/3097
See application file for complete search history.

(56) References Cited

U.S. PATENT DOCUMENTS

| | | |
|---|---|---|
| 3,647,924 A | 3/1972 | Rasquin |
| 4,480,677 A | 11/1984 | Henson et al. |

(Continued)

*Primary Examiner* — Joseph S Del Sole
*Assistant Examiner* — Baileigh Kate Darnell
(74) *Attorney, Agent, or Firm* — John A. Miller; Shumaker, Loop & Kendrick, LLP

(57) ABSTRACT

A system and method for manufacturing a space-based component in space. The method includes collecting and capturing space debris directly from and suspended in space, heating the collected space debris using solar radiation in a manner that separately and independently melts different constituent elements and compounds in the space debris, collecting the different constituent elements and compounds as they are being separately melted, storing the elements and compounds in a molten, solid or vapor form, and fabricating the space-based component using the stored elements and compounds.

20 Claims, 3 Drawing Sheets

Related U.S. Application Data division of application No. 15/280,448, filed on Sep. 29, 2016, now Pat. No. 10,654,596.

(51) Int. Cl.

| | | |
|---|---|---|
| *B33Y 70/00* | (2020.01) |
| *B33Y 80/00* | (2015.01) |
| *B22F 3/00* | (2021.01) |
| *B22F 5/00* | (2006.01) |
| *B22F 12/00* | (2021.01) |
| *B22F 12/44* | (2021.01) |
| *B29L 31/30* | (2006.01) |

(56) References Cited

U.S. PATENT DOCUMENTS

| | | | |
|---|---|---|---|
| 4,988,274 A | 1/1991 | Kenmochi | |
| 5,268,554 A | 12/1993 | Ream | |
| 5,421,540 A * | 6/1995 | Ting | B64G 1/1078 244/158.1 |
| 5,642,122 A | 6/1997 | Lockie et al. | |
| 6,206,328 B1 | 3/2001 | Taylor | |
| 7,594,530 B1 | 9/2009 | Tucker | |
| 7,807,097 B1 | 10/2010 | Tucker | |
| 7,971,831 B2 | 7/2011 | Roseman | |
| 7,988,096 B2 | 8/2011 | Humphries | |
| 8,600,580 B2 | 12/2013 | Fisher | |
| 8,882,048 B2 | 11/2014 | Levin et al. | |
| 9,266,627 B1 | 2/2016 | Anderson et al. | |
| 9,656,426 B2 | 5/2017 | Snyder et al. | |
| 10,099,467 B2 | 10/2018 | Snyder et al. | |
| 2007/0179656 A1 | 8/2007 | Eshed et al. | |
| 2007/0241482 A1 | 10/2007 | Giller et al. | |
| 2014/0263844 A1 | 9/2014 | Cook, Jr. et al. | |
| 2015/0209978 A1 * | 7/2015 | Snyder | B33Y 40/00 425/162 |
| 2016/0107380 A1 | 4/2016 | Smoot et al. | |
| 2017/0036783 A1 | 2/2017 | Snyder | |

* cited by examiner

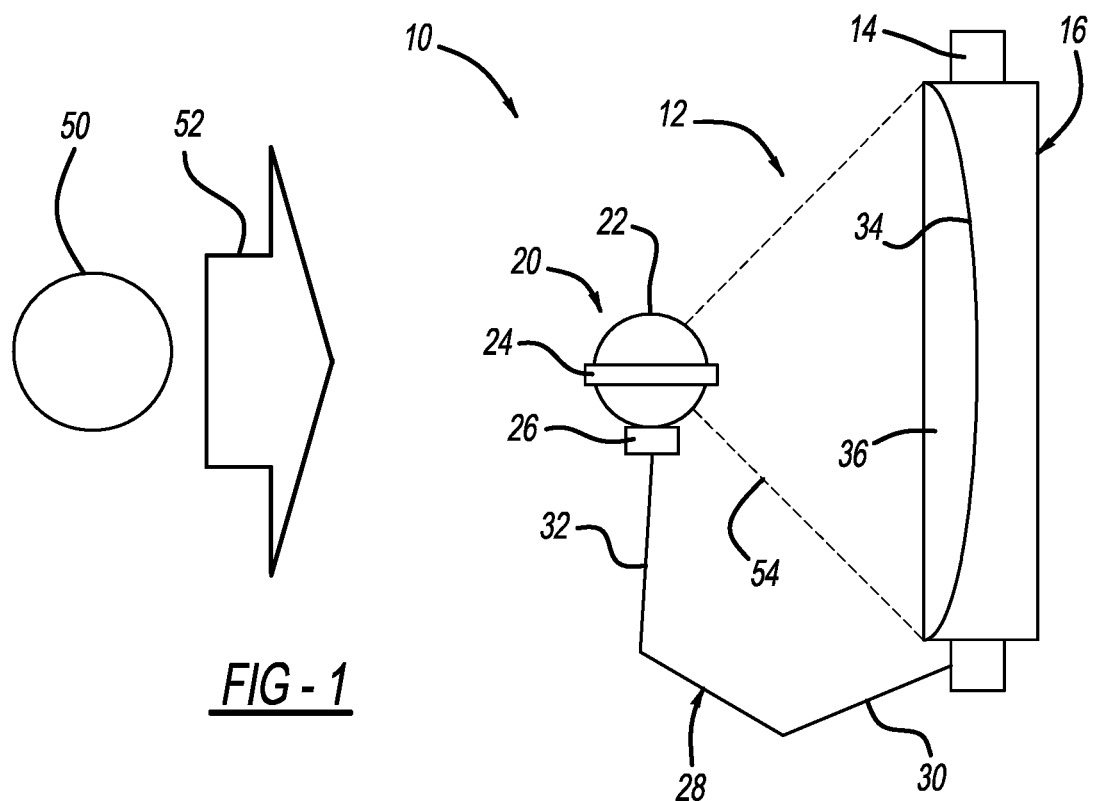
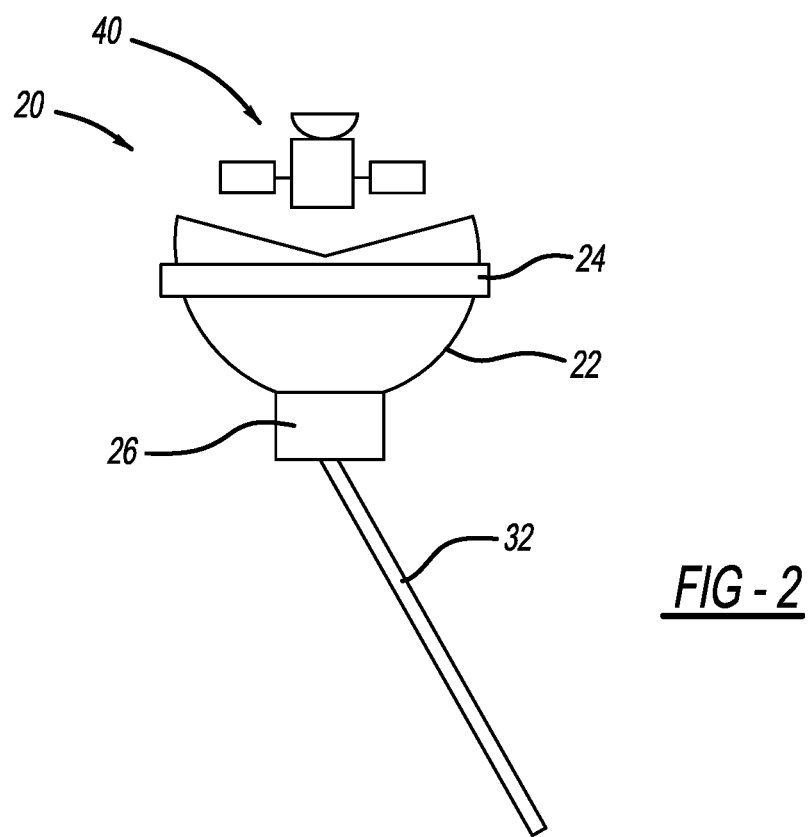

SYSTEM AND METHOD FOR MANUFACTURING A SPACE-BASED COMPONENT

CROSS-REFERENCE TO RELATED APPLICATIONS

This application is a continuation application of U.S. patent application Ser. No. 16/718,938 filed Dec. 18, 2019, titled System and Method for Vaporizing Space Debris, which is a divisional application of U.S. patent application Ser. No. 15/280,448 filed Sep. 29, 2016, titled On-Orbit Thermal Extraction of Raw Materials from Space Debris in Support of Additive Manufacturing of New Space Elements On-Orbit, now U.S. Pat. No. 10,654,596.

BACKGROUND

Field

This invention relates generally to a system and method for manufacturing a spaced-based component in space and, more particularly, to a system and method for manufacturing a spaced-based component in space that includes collecting and capturing space debris directly from and suspended in space and heating the collected space debris using solar radiation in a manner that separately and independently melts different constituent elements and compounds in the space debris.

Discussion

Many satellites have been and continue to be launched into Earth orbit for various applications, both military and civilian, such as for communications, Earth observation, scientific study purposes, etc. These satellites are usually positioned in a geosynchronous Earth orbit (GEO), medium Earth orbit (MEO) or low Earth orbit (LEO). As is known in the art, a satellite in GEO has an altitude and speed that allows it to orbit the Earth at one revolution per day, thus causing the satellite to appear to remain stationary above a particular point on the Earth. Other orbits are also available for satellites.

The launch of satellites from the Earth creates space debris as a result of discarded rocket boosters and other components required to position the satellite in the desired orbit. Further, satellites that become worn out, obsolete, defective, etc., may be taken out of service and remain on orbit, also contributing to the space debris. Satellites in GEO that are taken out of service are often moved from GEO to a higher altitude, such as 200 miles above GEO, to a graveyard orbit before they are taken out of service and become non-functioning so as to open up GEO slots for other newer functioning satellites. Also, space debris can collide with each other creating exponentially more individual pieces of space debris. Thus, space debris comes in all sizes from very small flecks to full-sized satellites and rocket boosters.

Typically, space debris orbits the Earth at a very high speed, and thus can be a hazard to functioning and operating spacecraft and satellites if they collide. The U.S. Government and others track many thousands of space debris elements, including very small components, and provide an avenue through which the position of active spacecraft and satellites can be altered to avoid collisions. However, the amount of space debris continues to increase, and eventually some form of debris removal process will be necessary.

BRIEF DESCRIPTION OF THE DRAWINGS

FIG. 1 is an illustration of a spacecraft system including a spacecraft that collects and refines material from space debris for manufacturing new spacecraft systems;

FIG. 2 is a close-up illustration of a solar refinery portion of the spacecraft system shown in FIG. 1;

DETAILED DESCRIPTION OF THE EMBODIMENTS

Figure 3:
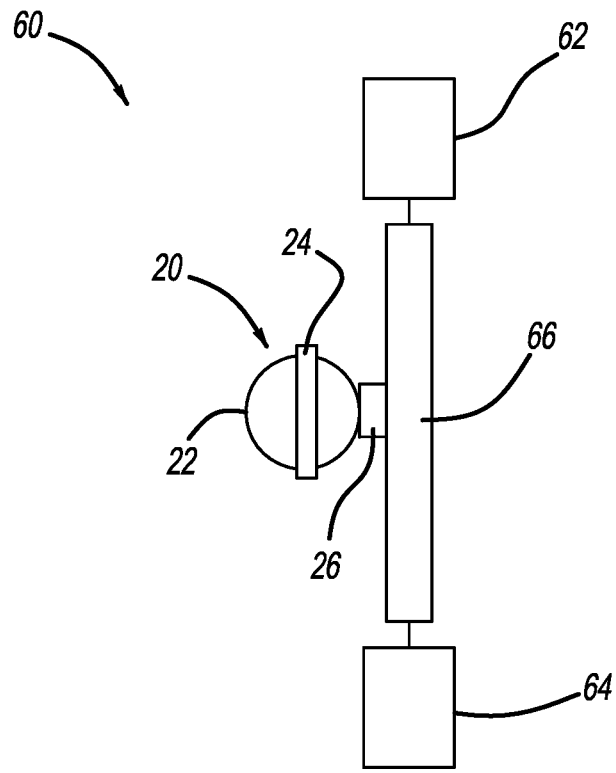
FIG. 3 is an illustration of a debris collector and new spacecraft fabrication and assembly spacecraft that employs solar arrays to collect solar energy instead of the solar concentrator shown in the spacecraft system in FIG. 1.

The following discussion of the embodiments of the invention directed to a system and method for manufacturing a spaced-based component in space is merely exemplary in nature, and is in no way intended to limit the invention or its applications or uses.

Orbital space debris can be a resource of materials since the debris includes the elements that are of the type necessary to make new space systems, such as new satellites. In order to accomplish this, it is necessary to be able to collect the debris, separate the elements, and then use the elements in a manufacturing system that is itself part of a satellite orbiting the Earth. The development of 3-D printing, also known as additive manufacturing (AM), provides one way to deposit material into new useful systems. As is known, 3-D printing is a process where a material is fed into a heated nozzle and is laid down layer by layer to build a desired a product. Conventional subtractive manufacturing as well as vapor deposition and material removal processes used to produce integrated circuits on the Earth's surface are also processes that can be used to produce spacecraft on-orbit, once usable material has been refined, collected and stored in-orbit.

Spacecraft produced in-situ or in-orbit have an advantage over spacecraft produced terrestrially in a satellite factory because spacecraft produced in-situ do not need to withstand the high forces required for launch, including accelerating to ~8 km/sec in less 15 minutes. Spacecraft that are manufactured on-orbit, using techniques such as 3-D printing do not require the strong structure needed by spacecraft produced on Earth to survive launch. Spacecraft produced on-orbit can be simple flat panels, for example, with antenna elements on the face of the panel aimed downward towards Earth, solar arrays on the backside of the panel aimed towards the sun and the various elements needed for a spacecraft inside the panel. These spacecraft elements can be arranged in layers inside the panel, similar to the make-up of printed circuit boards made on Earth. Thus, if a viable system could be employed to separate space debris into its various elements and then laid-down or assembled as a spacecraft using 3-D printing, subtractive or vapor deposition techniques, then what is now the current problem of thousands of spacecraft in the GEO graveyard orbit would be converted into a high value resource since this material can be used to produce new spacecraft and does not need the high cost of being launched into GEO orbit where it will be used, since it is already there. The existence of a technology to seamlessly separate existing spacecraft material into useable stock piles for on-orbit production would be a technology worth potentially billions of dollars because it could deliver billions of dollars of mission value through use as new types of communications and ground observation satellites. Ultimately the combination between material separation and precision on-orbit production would mean that these systems can be reprocessed over and over, reducing or ultimately eliminating the need for new systems to be launched. Small elements that are difficult to produce on-orbit initially, such as computer processors, can always be launched from Earth in a single launch vehicle and used to economically enable the production of many spacecraft in-orbit.

As will be discussed below, the present invention proposes a spacecraft system that is placed on orbit around the Earth, and employs elements that allow the system to collect space debris, such as non-functioning satellites, selectively heating the collected debris at precise different temperatures to melt the different elements in the debris at different times so that they can be separately collected, and then retrieving the separated elements as needed in an on-orbit manufacturing process to fabricate new spacecraft systems having updated and desired features, where it is subsequently put into operation.

FIG. 1 is an illustration of a spacecraft system 10 including a spacecraft 12 having a spacecraft body 14 and a solar concentrator 16 mounted thereto. The solar concentrator 16 can be any suitable solar concentrator for the purposes described herein, such as a parabolic reflector, Fresnel lens, light focusing element, etc., and needs to be of the proper size to generate enough focused energy to melt spacecraft elements as will be discussed below. In one embodiment, the solar concentrator 16 is a parabolic dish 34 having a reflective surface 36 and being about 100 feet in diameter. The spacecraft body 14 includes all of the elements necessary to operate the spacecraft 12 as discussed herein, including antennas, communications systems, thrusters, etc. The spacecraft 12 also includes a solar refinery 20 having a curved crucible 22, a collection element 24, a rotary actuator 26 and a manipulator 28 having a number of arm sections 30 including a processing section 32, where the manipulator 28 is coupled to the spacecraft body 14.

FIG. 2 is an illustration of the solar refinery 20 shown in detail without the rest of the spacecraft 12 shown, but showing the crucible 22 being in an open position so as to allow it to capture spacecraft debris, such as a launch vehicle upper stage or component, represented here as a retired spacecraft 40, where the spacecraft debris can be any debris orbiting the Earth. It is noted that the discussion herein of employing the crucible 22 to collect and refine the retired spacecraft 40 is by way of a non-limiting example in that any system or device suitable to heat and separate constituent elements based on temperature may be able to be employed. The spacecraft 12 is moved to a suitable location near the retired spacecraft 40 using onboard thrusters (not shown), or the debris can be moved to the spacecraft by another vehicle, and then the manipulator 28 is actuated to position the crucible 22 directly adjacent to the retired spacecraft 40 to capture it. Once the retired spacecraft 40 is positioned within the crucible 22, the crucible 22 is closed so as to confine the retired spacecraft 40 therein. Once the retired spacecraft 40 is secured within the crucible 22, then the manipulator 28 moves the crucible 22 relative to a focal point of the solar concentrator 16, as shown in FIG. 1, to heat the debris.

The concentrator 16 is then oriented towards the sun 50 and solar flux 52 received by the concentrator 16 is focused onto the crucible 22 as a focused beam 54 to heat the retired spacecraft 40 therein and melt a select set of the constituent elements. The crucible 22 can be made of any suitable high temperature material, such as graphite or tungsten, that has a high enough melting temperature, so that the heat necessary to melt the spacecraft elements is not hot enough to heat or damage the crucible 22. The rotary actuator 26 rotates the crucible 22 so that the focused beam 54 is not focused on a single spot on the crucible 22 so as to help prevent the crucible 22 from being damaged or melted. Alternately, the actuator 26 can be a linear actuator. Careful movement of the refinery 20 relative to the solar flux 54 and rotation of the refinery 20 allows control of the refinery's temperature and the temperature of its contents. The entire spacecraft 12 can also be moved from slightly off-pointed from the Sun 50 to be directly aimed at the Sun 50 to adjust the temperature of the debris inside the crucible 22. The retired spacecraft 40 is held inside the crucible 22 so that it rotates with the crucible 22, which causes the particular element that is being melted to be flung out by centripetal force or other forces induced by movement of the crucible 22 and its contents towards the inside surface of the outer walls of the crucible 22.

The manipulator 28 can position the crucible 22 in the focused beam 54 so that the internal temperature of the crucible 22 is precisely controlled so as to sequentially melt one material of the retired spacecraft 40 after another. As the constituent elements are heated within the crucible 22 and the crucible 22 is rotated or moved, those melted elements are collected by collection devices (not shown) in the collection element 24. For example, if the manipulator arm 28 positions the crucible 22 at a certain location in the focused beam 54 so that the crucible 22 heats up to a particular temperature, the element in the retired spacecraft 40 that melts at that temperature will melt and be collected by a certain collection device, such as a closable chamber, in the element 24, where that chamber is closed once the crucible 22 is heated for some period of time. An angled or curved shape to the crucible wall can direct the molten material into the collection element 24 that collects the material for use during the production phase. The manipulator 28 then moves the crucible 22 to a different location in the focused beam 54 so that the temperature of the crucible 22 increases and a different element in the retired spacecraft 40 is melted independent of the other elements, and is collected in a different collection compartment in the collection element 24 in the same manner. This process continues until all of the constituent elements in the retired spacecraft 40 are melted and collected, where any material left over in the crucible 22 can be mechanically collected and compressed for use as ballast or other various applications. The collected material can be reheated for 3-D printing production using the solar flux 52 or using electrical power produced by solar arrays (not shown in FIG. 1). Material can also be vaporized and then condensed on cold plates (not shown) as a way of increasing the purity of the material, before eventually being melted and collected for on-orbit manufacturing using the same system, with cold plates added.

As discussed above, the solar concentrator 16 is used to focus the solar flux 52 to generate the heat. However, in an alternate embodiment, it is possible to generate heat using the solar flux 52 in a different manner. FIG. 3 is an illustration of a spacecraft 60 that can replace the spacecraft 12, where like elements are identified by the same reference number. In the spacecraft 60, the solar concentrator 16 is replaced with solar arrays 62 and 64 and the spacecraft body 14 includes a spacecraft fabrication module 66. The solar arrays 62 and 64 convert the solar flux 52 to electrical energy in a known manner. The electrical energy generated by the solar arrays 62 and 64 is transferred by suitable electrical wiring (not shown) through the fabrication module 66 to, for example, resistive heaters (not shown) provided within the crucible 22. Although the spacecraft 60 that employs the solar arrays 62 and 64 may be more efficient for generating the heat to separate the constituent elements from the space debris, solar arrays are typically very expensive, and it may be more cost effective to use the solar concentrator 16.

Once all of the elements are collected in the collection element 24, which can contain the collected material from multiple retired spacecraft and other debris, the present invention proposes using those now separated elements that may be in various levels of purity to fabricate a new spacecraft system using in this example one or more 3-D printers, as mentioned above. The 3-D printer can be any suitable 3-D printer that is configurable in the manner discussed herein. The 3-D printer or manufacturing system can be located at any suitable location on the spacecraft 12 or 60, for example, in the section 32 of the manipulator 28 or in the fabrication module 66. Alternately, the manufacturing system can be flying in formation with the spacecraft 12.

Figure 4:
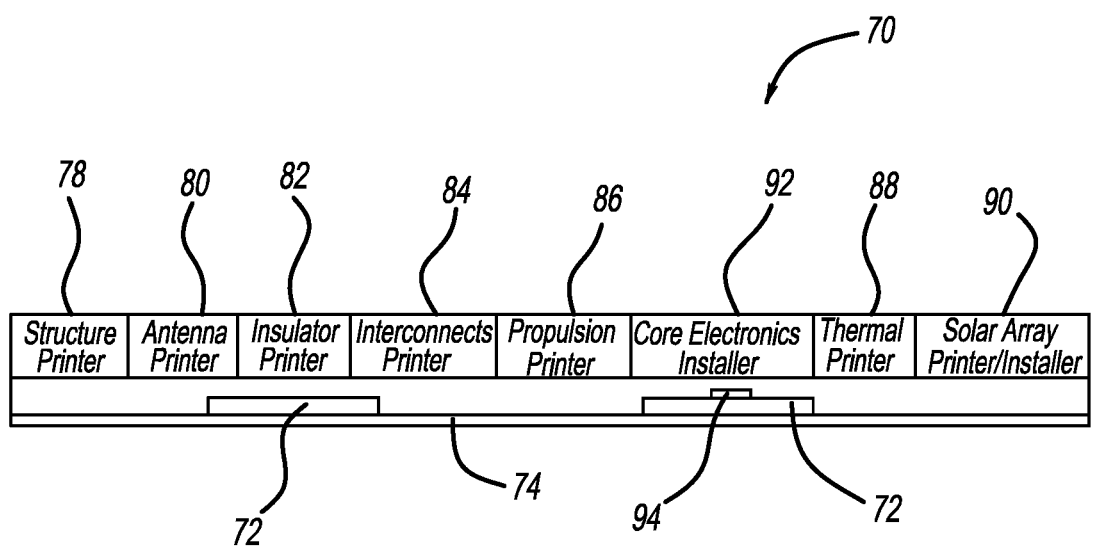
FIG. 4 is an illustration of an assembly line like layout of an on-orbit spacecraft manufacturing module that uses 3-D printing, and subtractive or vapor deposition manufacturing approaches to produce spacecraft in orbit.

FIG. 4 is an illustration of a spacecraft fabrication and assembly module 70 generally illustrating a 3-D printing process, where the module 70 fabricates the new spacecraft, referred to herein as a panelsat 72, as it moves or is moved along a flat fabrication backplane 74 from left to right in this illustration. Alternately, other three-dimensional layered or pocketed structures or components can be produced. Also, the 3-D printing or other production elements can be moved to work on a stationary panelsat as it is built-up. This example panelsat 72 is defined as very similar to a single large electronic circuit board, where the payload and spacecraft systems are integrated together and laid down in layers or in adjacent spaces to form a complete spacecraft. Spacecraft sub-assemblies, boxes, wire harnesses or conventional single function bolt-on units are not required since the in-orbit spacecraft can be organically built-up with integrated structures, harnessing and active elements as a single structure. Use of modular elements with different functionality is possible but not required. It is noted that fabrication of the panelsat 72 is by way of a non-limiting embodiment in that other configurations for other spacecraft are within the scope of the present invention.

The module 70 includes a plurality of 3-D printers, conventional subtractive fabrication devices or vapor deposition and removal devices each performing a different printing, fabricating, layering or removal operation in a certain sequence. In this example, the module 70 includes a structure printer 78, an antenna printer 80, an insulator printer 82, an interconnects printer 84, a propulsion printer 86, a thermal printer 88 and a solar array printer 90 are used. Each of the printers removes the material collected in the collection element 24 necessary for the printing operation using any suitable technique, where the material may be in molten, solid or vapor form. This fabrication process allows the panelsat 72 to have radiators and antenna elements on one side of the panelsat 72 that will face the Earth, all the various sub-systems, control modules, computers, etc., in the middle of the panelsat 72 and a solar array on an opposite surface of the panelsat 72 facing away from the Earth. The first elements could lay down a grid of active antenna elements covered by insulation material and linking structures with vias where power connections run in layers between each of the vias and other active elements. The structure printer 78 can print a relatively non-robust structure that does not need to survive spacecraft launch, and may be a honeycomb or webbed configuration where openings in the structure allow various subsequently printed elements to be supported and integrated therein.

Some of the elements that may go into the panelsat 72 may not be able to be printed on orbit as described, such as high level electronics, computers, etc. One or more high level elements, such as a plug-in box, can be brought from the Earth to provide a central computer, precision ACS elements and even propulsion functions until the technology to produce these elements on-orbit is available. Those elements, represented as element 94 on the panelsat 72, can be plugged into the panelsat 72 by a core electronics installer 92. The ultimate goal would be to fabricate the entire panelsat 72 in space.

It is noted that although the discussion herein talks about employing 3-D printing to fabricate new spacecraft systems, other manufacturing processes, such as conventional subtractive, vapor deposition and laser etching, may also be employed on orbit to use the constituent elements to generate the new spacecraft system. Further, it may be possible to take advantage of the vacuum environment in space when fabricating certain integrated circuit chips that are fabricated by, for example, chemical vapor deposition processes.

It is further noted that the process of melting constituent elements for a 3-D fabrication printer as discussed herein can also be employed for asteroid mining, where the spacecraft 12 collects the material from an asteroid instead of space debris for subsequent spacecraft fabrication.

The discussion above talks about melting constituent elements in space debris that are separately collected and then used in an additive manufacturing process to produce a new spacecraft system, where the heat necessary to melt the elements is provided by focusing sun light or collecting sun light by a solar array. Instead of melting the constituent elements and then reusing them in a manufacturing process, the present invention also proposes eliminating space debris by vaporizing the debris, where the vapor is then harmlessly disbursed in space. For this embodiment, it is not necessary to separately control the temperature that the elements are heated, but it is necessary to significantly heat the elements above the melting temperature of the element to vaporize it.

Figure 5:
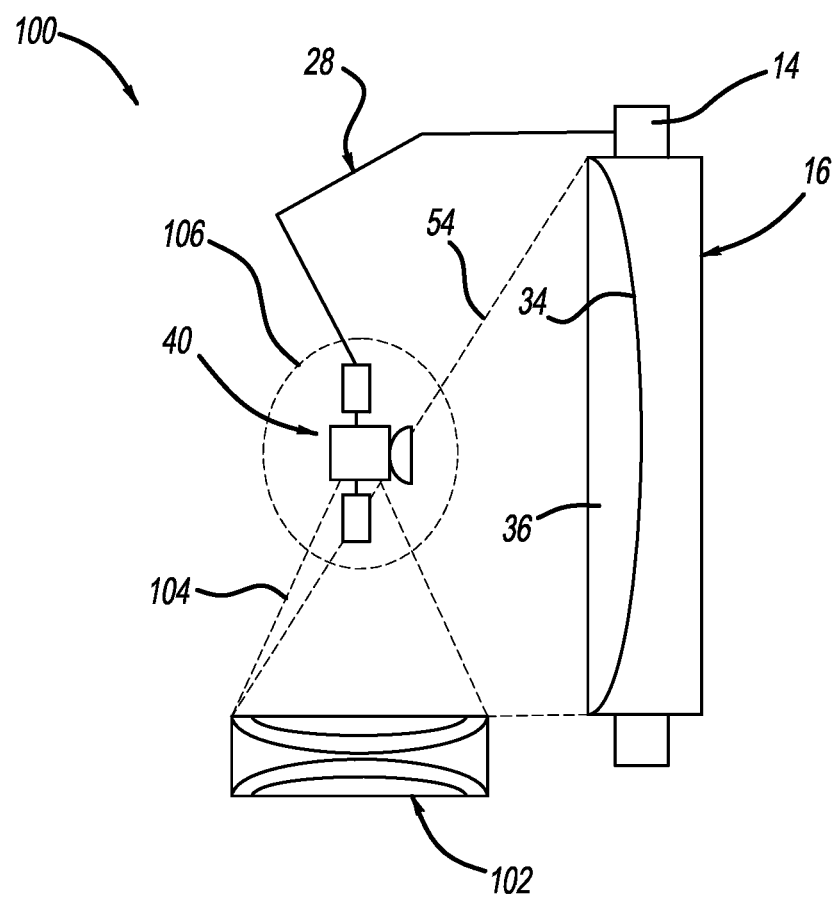
FIG. 5 is an illustration of a modification to the solar concentrating debris conversion spacecraft that refocuses the Sun's energy from the primary concentrator in order to achieve even higher temperatures sufficient to completely vaporize any space debris.

FIG. 5 is an illustration of a spacecraft system 100 showing this embodiment of the invention, where like elements to the system 10 are identified by the same reference number. In this embodiment, the manipulator arm 28 is used to grab the retired spacecraft 40 and position it at the appropriate high heat intensity location. Because the sun is not a point source, the focal point of the solar flux 52 from the sun 50 off of the concentrator 16 is not a well defined point. In other words, the size of the sun blurs its focused energy so that the higher temperature elements and compounds in the retired spacecraft 40 will not vaporize. Therefore, in order to obtain the heat necessary to vaporize all of the elements on the retired spacecraft 40, such as tungsten and carbon, the solar collector 16 would need to be uneconomically large. Thus, the system 100 includes a secondary solar point-source concentrator 102 that is positioned at the focal point of the concentrator 16 and focuses the beam 54 to be a more focused beam 104 to achieve the desired vaporization temperature. The vapor that is dispersed from the retired spacecraft 40 under the high heat is represented by dotted line 106. The orientation between the concentrators 16 and 102 is shown here by way of a non-limiting example in that this orientation can be any suitable orientation for a specific application.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for manufacturing a space-based component, said method comprising:
    collecting and capturing space debris directly from and suspended in space;
    heating the collected space debris using solar radiation in a temperature controlled manner so that the amount of heat provided by the solar radiation selectively, separately and independently melts different constituent elements and compounds in the space debris that have different melting points;
    collecting the different constituent elements and compounds as they are being separately melted;
    storing the separately melted different constituent elements and compounds in a molten, solid or vapor form; and
    fabricating the space-based component using the stored and separately melted different constituent elements and compounds.

2. The method according to claim 1 wherein fabricating the space-based component includes using one or more 3-D printers for printing the space-based component.

3. The method according to claim 2 wherein fabricating the space-based component includes using printers capable of printing parts or portions of parts specialized to particular elements or compounds.

4. The method according to claim 1 wherein the spaced-based component is a panelsat or other three-dimensional layered or pocketed structure or component including antennas facing the Earth on one side of the panelsat, solar arrays on other or opposite sides of the panelsat and a complex layered or pocketed structure.

5. The method according to claim 1 wherein collecting and capturing space debris includes using a three-dimensional crucible having a clam-shell or otherwise openable design that allows the crucible to open and collect the space debris.

6. The method according to claim 5 wherein heating the collected space debris using solar radiation includes using a rotary or linear actuator that rotates or moves the crucible so as to evenly heat the crucible and provide centripetal or varying forces to move and extract melted materials or vaporized and then condensed materials.

7. The method according to claim 1 wherein heating the collected space debris using solar radiation includes using a solar concentrator that receives solar flux from the sun and focuses it to a certain location.

8. The method according to claim 7 wherein the solar concentrator is selected from the group consisting of a parabolic mirror, a Fresnel lens and a light focusing element.

9. The method according to claim 1 wherein heating the collected space debris using solar radiation includes using at least one solar array and at least one resistive heater.

10. The method according to claim 1 wherein the space debris is a retired spacecraft or launch vehicle upper stage or component.

11. A system for manufacturing a space-based component, said system comprising:
    means for collecting and capturing space debris directly from and suspended in space;
    means for heating the collected space debris using solar radiation in a temperature controlled manner so that the amount of heat provided by the solar radiation selectively, separately and independently melts different constituent elements and compounds in the space debris that have different melting points;
    means for collecting the different constituent elements and compounds as they are being separately melted;
    means for storing the separately melted different constituent elements and compounds in a molten, solid or vapor form; and
    means for fabricating the space-based component using the stored and separately melted different constituent elements and compounds.

12. The system according to claim 11 wherein the means for fabricating the space-based component uses one or more 3-D printers for printing the space-based component.

13. The system according to claim 12 wherein the means for fabricating the space-based component uses printers capable of printing parts or portions of parts specialized to particular elements or compounds.

14. The system according to claim 11 wherein the spaced-based component is a panelsat or other three-dimensional layered or pocketed structure or component including antennas facing the Earth on one side of the panelsat, solar arrays on other or opposite sides of the panelsat and a complex layered or pocketed structure.

15. The system according to claim 11 wherein the means for collecting and capturing space debris uses a three-dimensional crucible having a clam-shell or otherwise openable design that allows the crucible to open and collect the space debris.

16. The system according to claim 15 wherein the means for heating the collected space debris using solar radiation uses a rotary or linear actuator that rotates or moves the crucible so as to evenly heat the crucible and provide centripetal or varying forces to move and extract melted materials or vaporized and then condensed materials.

17. The system according to claim 11 wherein the means for heating the collected space debris using solar radiation uses a solar concentrator that receives solar flux from the sun and focuses it to a certain location.

18. The system according to claim 17 wherein the solar concentrator is selected from the group consisting of a parabolic mirror, a Fresnel lens and a light focusing element.

19. The system according to claim 11 wherein the means for heating the collected space debris using solar radiation uses at least one solar array and at least one resistive heater.

20. The system according to claim 11 wherein the space debris is a retired spacecraft or launch vehicle upper stage or component.

\* \* \* \* \*